(12) United States Patent
Ramachandran (10) Patent No.: US 6,937,788 B2
(45) Date of Patent: Aug. 30, 2005

(54) ADJUSTABLE DISPERSION COMPENSATOR WITH FEW MODE FIBERS AND SWITCHABLE MODE CONVERTERS

(75) Inventor: Siddharth Ramachandran, Hoboken, NJ (US)

(73) Assignee: Furukawa Electric North America, Norcross, GA (US)

( * ) Notice: Subject to any disclaimer, the term of this patent is extended or adjusted under 35 U.S.C. 154(b) by 266 days.

(21) Appl. No.: 10/234,287

(22) Filed: Sep. 4, 2002

(65) Prior Publication Data

US 2004/0047551 A1 Mar. 11, 2004

(51) Int. Cl.[7] ................................................. G02B 6/42
(52) U.S. Cl. .............................. 385/28; 385/123; 385/2; 385/122
(58) Field of Search ........................... 385/28, 123, 16, 385/17–24, 2, 122, 27

(56) References Cited

U.S. PATENT DOCUMENTS 6,151,431 A * 11/2000 White ......................... 385/21

* cited by examiner

Primary Examiner—Frank G. Font
Assistant Examiner—Michael P. Mooney
(74) Attorney, Agent, or Firm—Peter V. D. Wilde (57) ABSTRACT

The specification describes dispersion compensators that are adjustable based on selection of mode propagation properties of two or more modes. The fundamental device structure comprises two or more sections of optical fiber that support the fundamental mode as well as well as one or more higher-order-modes (HOM). The HOM fibers are connected to each other by means of a spatial mode-converter (MC) that is switchable. The MC may be fabricated with, for example, long-period fiber-gratings (LPG), coupled waveguide devices, free-space phase-retardation elements, micro-electro-mechanical devices, or acousto-optic couplers. The MC is assembled such that it transforms any incoming spatial mode into one of any other guided modes in the HOM fiber. Switching is achieved by strain, temperature, the electro-optic or nonlinear optic effect, or any other physical effect that changes the refractive index of the optical material used to construct the MC.

20 Claims, 8 Drawing Sheets

ADJUSTABLE DISPERSION COMPENSATOR WITH FEW MODE FIBERS AND SWITCHABLE MODE CONVERTERS

FIELD OF THE INVENTION

This invention relates to high-speed optical communications systems, and more specifically to controlling differential dispersion in broad-band multi-wavelength (wavelength division multiplexed—WDM) transmission media using tunable dispersion compensation devices.

BACKGROUND OF THE INVENTION

Dispersion compensating devices are essential building blocks of high-speed optical communications systems. Important requirements include low loss and the ability to compensate the dispersion at every wavelength of a wavelength-division-multiplexed (WDM) lightwave system. In addition to static dispersion compensation, high-speed optical communications systems also require tunable dispersion-compensators (TDC). They facilitate offsetting variations in dispersion in a fiber optic transmission line. The variations may be due to environmental changes (varying stress or temperature of the transmission fiber and components), power fluctuations leading to varying nonlinear phase shifts, or dynamic reconfigurations of networks that alter the path lengths of various WDM channels. See B. J. Eggleton et. al, *J. Lightwave Tech.*, vol. 18, p. 1419 (2000). Alternatively, the variations may arise from statistical fluctuations of dispersion in the transmission fiber, as well as statistical variations in the length of transmission fiber between adjacent amplifier huts.

To date, several tunable or adjustable dispersion compensators have been proposed and demonstrated. Chirped fiber-Bragg-gratings (FBG) have been used extensively to tune the dispersion of lightwave signals. For example, a FBG with linear or nonlinear chirp can be tuned by a heating element or a latchable magnetic strain, to vary the dispersion of the device. See U.S. Pat. Nos. 6,148,127 and 6,330,383. Dispersion tuning ranges of ~2000 ps/nm over bandwidths of 1 to 1.5 nm have been demonstrated by this technique. The limited bandwidth of such tunable devices restricts its use to single channel applications. Using this device in a WDM system would entail de-multiplexing the signal into individual wavelength channels, and using a distinct FBG-based TDC for each channel, making it very costly. Alternatives to single channel FBG-TDCs include sampled FBGs that can compensate the dispersion for three or four channels simultaneously. While this reduces the number of devices needed in a WDM system by a factor of three to four, it still remains a costly means to implement tunable dispersion management. Moreover, all TDCs that utilise FBGs suffer from group-delay (GD) ripple impairments that lead to bit-error-rate (BER) power penalties. Further, the GD-ripple increases with bandwidth or dispersion of the device. An additional complication is that a practical FBG based TDC would entail fabricating FBGs on meter-lengths of fibers for dispersion-compensation over an entire communication band. Fabrication and tuning methods for such long gratings would appear impractical.

An alternate technique is to use the variable phase response of optical filters to tune dispersion. Planar waveguide-based all-pass filters have been demonstrated to provide TDC with tuning ranges of up to 500 ps/nm at 40 Gb/s. See C. K. Madsen, *Proc. Optical Fiber Conf.* 2002, papers No. TUT-1 and FD-9. The dispersion of virtually imaged phase array (VIPA) devices can be tuned by translating a specially designed free-space mirror, as described in U.S. Pat. No. 6,392,807. This device has been demonstrated to provide +/–800 ps/nm tuning range. See Shirasaki, et al., *Proc. European Conf. Optical Comm.*—2000, PD-2,3. Both these technologies, as well as several others that utilize the phase response of optical filters, are periodic with respect to wavelength, and can thus provide simultaneous compensation to all channels as long as they are designed to have a periodicity coincident with the WDM channels. However, all such devices suffer from a wavelength dependent response within each "pass-band". Hence, these devices may not be suitable for high bit-rate applications because of the trade-off between dispersion and bandwidth. They also suffer from GD ripple impairments like FBG-based TDCs. Finally, phase-response based devices require coupling light in and out of the transmission fiber, which makes them lossy.

Thus, there exists the need for a device that can offer tunable or adjustable dispersion with an optical performance similar to that of dispersion-compensating fibers (DCF) or higher-order-mode dispersion-compensating modules (HOM-DCM) commonly used for static dispersion compensation. The desirable features would be low loss, low multipath interference, negligible GD ripple, and most importantly, a response that is continuous in wavelength.

STATEMENT OF THE INVENTION

The invention is based on the realization that each spatial mode of a few-mode fiber has different modal dispersion. Thus, light travelling in different spatial modes in such a fiber will accumulate different amounts of dispersion, depending on the mode of propagation and the length of fiber used. This realization leads to novel device structures to implement this concept. The fundamental device structure comprises two or more sections of optical fiber that support the fundamental mode as well as well as one or more higher-order-modes (HOM). Optical fibers with this characteristic are sometimes referred to as few mode fibers. The few mode fibers are connected to each other by means of a spatial mode-converter (MC) that is switchable. A spatial mode-converter, in its most general form, transforms one incoming spatial mode into another. A switchable mode-converter will perform the mode-transformation in one state, but let light pass through without any transformation, in another state. The MC may be fabricated with long-period fiber-gratings (LPG), coupled waveguide devices, free-space phase-retardation elements, or micro-electromechanical (MEMs) based routers and switches. In the most general form, the MC is assembled such that it transforms any incoming spatial mode into one of any other guided modes in the HOM fiber. The switching is achieved by strain, temperature, the electro-optic or nonlinear optic effect, or any other physical effect that serves to change the refractive index of, or the physical path length in, the optical material used to construct the MC. In addition, in the case of MEMs-based MCs, the switching is induced by a mechanical routing action that serves to transform any mode of the HOM fiber into one of any other modes supported by it.

More specifically, the dispersion compensator (DC) with adjustable higher-order-mode properties (referred to here onwards as AHOM), consists of N lengths of fiber and N+1 MCs connecting them to each other, and to the transmission fiber at the input and output, respectively. Each combination of switching states for the N+1 MCs will correspond to a unique path taken by the lightwave signal. This is because the signal can travel in one of two or more spatial modes of the fiber, depending on the switched state of each MC. Thus, various permutations of switched states for the MCs leads to a variety of dispersion values accumulated by the signal. In other words, the amount of dispersion the device yields for an incoming lightwave signal can be changed simply by changing the switching states of one or more of the N+1 MCs.

The primary advantage over previous TDC approaches is that the dispersion is provided by the fiber itself, and hence is continuous in wavelength throughout the spectral band covered by the MCs. Since the dispersion is due to the fiber-waveguide, GD ripple problems are minimized. Increasing the tuning range or decreasing the tuning step size simply entails reconfiguring the lengths and number of sections N, of fibers between each MC. Thus, this device does not suffer from dispersion-bandwidth tradeoffs, or manufacturing constraints that scale with tuning ranges or dispersion magnitudes.

BRIEF DESCRIPTION OF THE DRAWING

FIG. 10 shows a schematic of an optical communication system comprising the transmission fiber and: FIG. 10(a) a AHOM device according to the invention; FIG. 10(b) a static DC in addition to a AHOM device according to the invention.

FIG. 11 shows the schematic of a receiver in an optical communication system comprising: FIG. 11(a) a AHOM device according to the invention; FIG. 11(b) a static DC in addition to a AHOM device according to the invention, followed by an optical detection scheme that converts the optical signal into an electrical signal.

DETAILED DESCRIPTION

Figure 1:
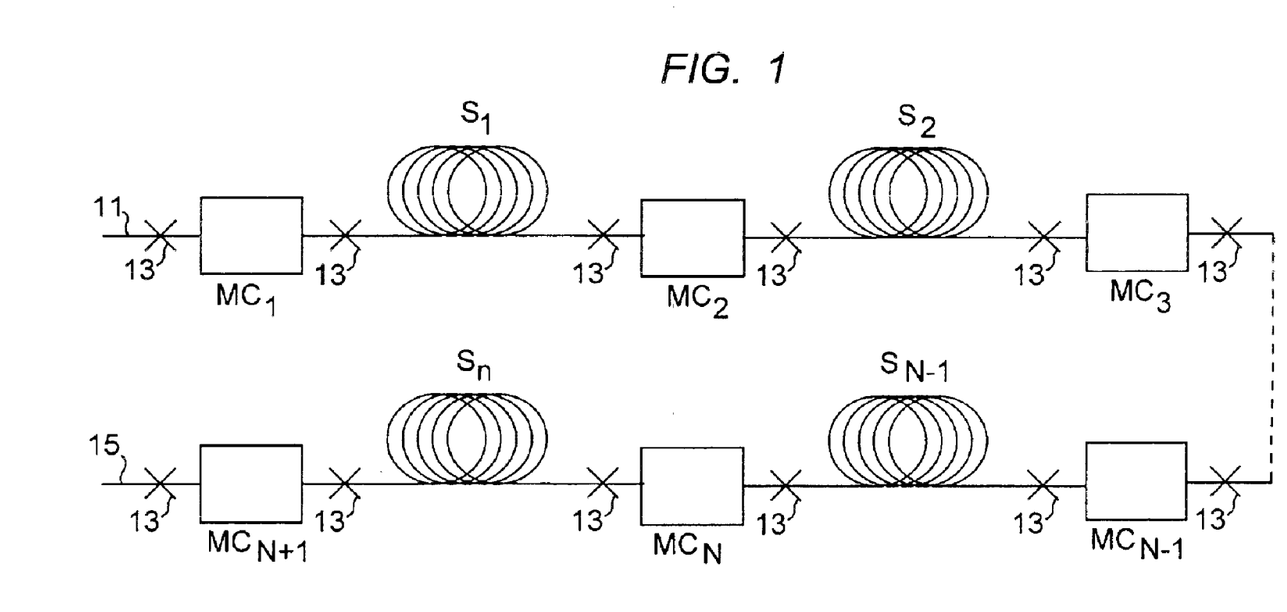
FIG. 1 is a schematic representation of the dispersion compensator of the invention.

Referring to FIG. 1, the arrangement shown represents the generic form of of the AHOM device. It shows a device with N spools $S_1-S_N$, of HOM fibers of length $L_1$, where each spool S is sandwiched between two mode-converters, in the series $MC_1-MC_{1+N}$ of mode converters. The input to the device is indicated at 11 and the output at 15. The MC devices and the spools of fiber $S_N$ are connected through splices shown at 13. The dashed line suggests additional spools and mode converters as desired. If the HOM fibers support M modes of different modal dispersion values, then light can take $M^N$ different paths, each path yielding a different total dispersion value. In this case, the dispersion of this device is given by:

$$D_{AHOM} = \sum_{i=1}^{N} L_i \cdot D_{k(i)} \quad (1)$$

where $D_{AHOM}$ is the total dispersion yielded by the AHOM, $D_{k(i)}$ is the dispersion of the $k^{th}$ mode of the fiber, and k(i) describes the switching configuration which determines which MC switches light into which $k^{th}$ mode (k takes values from 1 through M, the number of modes with different dispersion values supported by the fiber).

If the range of dispersion values achievable by the AHOM is $D_{range}$, then this configuration will allow the dispersion to be varied in steps of $D_{range}/(M^N-1)$ Thus, for relatively small values of M and N, a very fine granularity in achievable dispersion values can be realized. More generally, different series progressions of $D_{k(i)}$, spool lengths $L_i$, number of modes M, and number of segments N yield a plurality of device configurations that enable achieving arbitrary dispersion values, dispersion tuning ranges as well as dispersion step sizes.

The mode converter components of the AHOM device of the invention may take a variety of forms. A preferred mode converter is described and claimed in my co-pending patent application, filed of even date herewith, entitled TUNABLE MODE-CONVERTERS USING FEW MODE FIBERS. In that mode converter, a few mode fiber is used, and coupling is made between a fundamental, or near fundamental, propagation mode and the next, or closely adjacent, higher order mode (HOM). Both modes are core-guided, i.e. they propagate in the core of the optical fiber, thus maintaining efficient transmission through the HOM fiber. Mode coupling is effected using a long period grating (LPG) and the strength of the mode coupling is dynamically varied by changing the period of the grating or by varying the propagation constants of the two modes being coupled. The period of the grating is varied by physically changing the spacing between grating elements, for example by changing the strain on the grating to physically stretch the LPG. On the other hand, the propagation constants of the modes being coupled can be varied by any physical effect, such as the thermo-optic, nonlinear-optic, acousto-optic, electro-optic, stress or other effects, that serve to change the effective refractive index of a mode in a fiber. If the LPGs are formed by acousto-optic excitation, the period of the grating may be changed by varying the frequency of the acousto-optic modulation impressed upon the fiber. An important feature in the phase matching curve for these optical fibers is the existence of a turn-around-point (TAP). When the LPG grating period is chosen to couple at the TAP, large bandwidth mode-coupling is achieved. A TAP in an optical fiber exists when two modes (or more) have group indices that are essentially the same. The group index of a propagating mode is a well-known and well-defined optical parameter. It may be represented by:

$$n_g = n - \lambda dn/d\lambda \quad (2)$$

where $n_g$ is the group index, n is the refractive index and λ is the wavelength.

Figure 2:
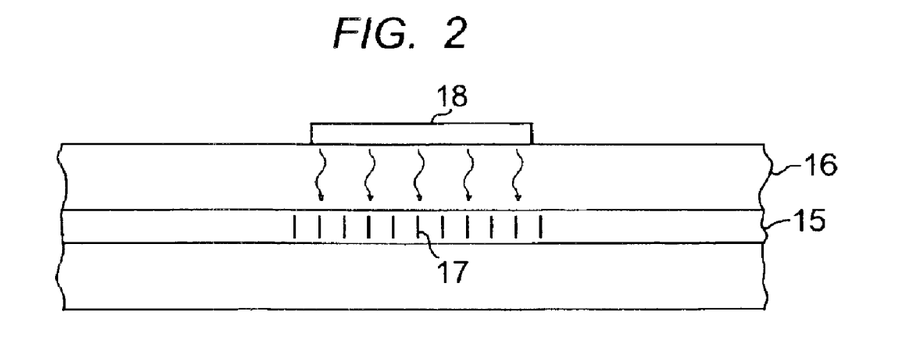
FIG. 2 is a schematic representation of a suitable mode converter unit for the dispersion compensator of FIG. 1.

In the application referenced above the adjustable LPG formed in a few mode fiber is referred to as a HOM-LPG. A schematic diagram of a HOM-LPG is shown in FIG. 2. The optical fiber is shown with core 15 and cladding 16. The LPG is shown at 17. A temperature control element for tuning the HOM-LPG is shown at 18.

Figure 3:
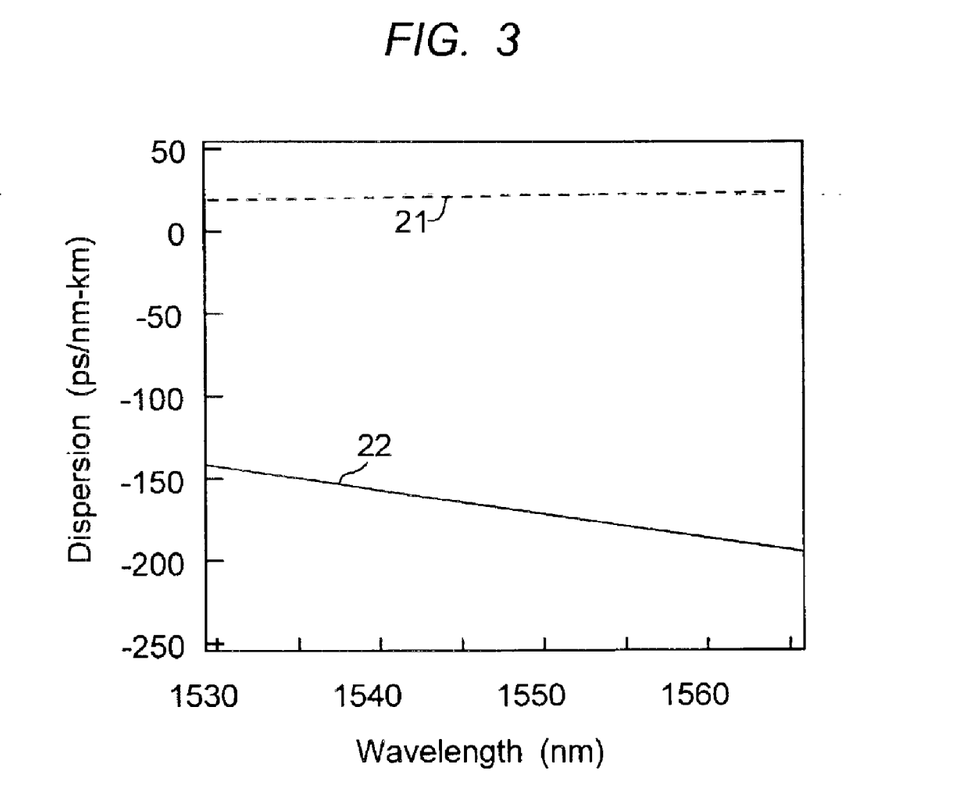
FIG. 3 is a plot of dispersion vs. wavelength showing the measured dispersion values for the $LP_{01}$ and $LP_{02}$ modes in a HOM fiber.

With reference to FIG. 3, curves 21 and 22 show the measured dispersion values for the $LP_{01}$ and the $LP_{02}$ core-guided modes, respectively, in the optical fiber. At 1550 nm, the $LP_{02}$ mode has a dispersion of $D_{02}=-168.9$ ps/nm-km, whereas the $LP_{01}$ mode has a dispersion of $D_{01}=+21.46$ ps/nm-km.

Figure 4:
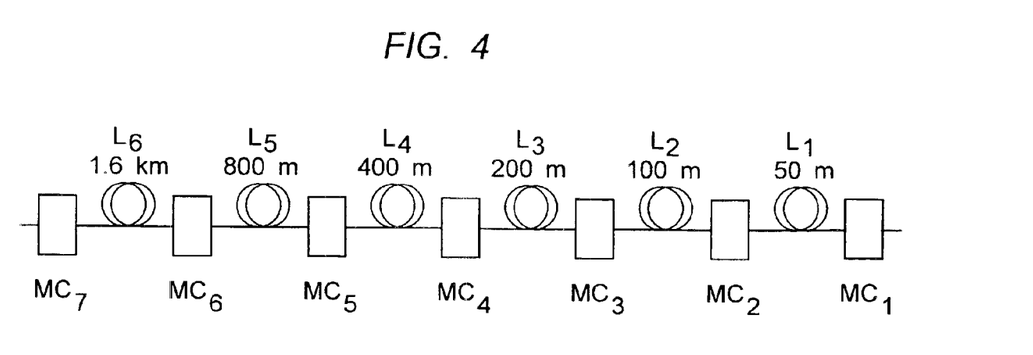
FIG. 4 is schematic representation of a specific embodiment of a AHOM according to the invention.

FIG. 4 is a schematic representation of a AHOM device that may be assembled with this fiber. The number of fiber segments N (refer to nomenclature in FIG. 1 and Eq. 1) is 6, connected by 7 identical (in this example) MCs that can be switched from an "ON" state to an "OFF" state. In the "ON" state, the MC transforms an incoming $LP_{01}$ mode into the $LP_{02}$ mode, or vice-versa. Conversely, in the "OFF" state, the incoming mode is transmitted without any mode-conversion. The lengths of the 6 segments of fibers, $L_i$, are arranged such that $L_i=2\times L_{i-1}$. Thus, the dispersion accumulated in either mode in each spool is twice the amount accumulated in the preceding spool. The shortest fiber segment has length, $L_1$ of 50 meters, yielding a total fiber length $L_{total}=3.15$ km in the device.

As was shown earlier the number of dispersion values this device can take is $2^6=64$. Further, since each fiber segment differs in length from an adjacent segment by a factor of 2, it can be shown that the dispersion values that are achievable are equally spaced. The largest dispersion value is obtained when light travels exclusively in the $LP_{01}$ mode. On the other hand, the smallest dispersion value is obtained when light travels exclusively in the $LP_{02}$ mode.

$$D_{max}=D_{01}\times L_{total}=+67.599 \text{ ps/nm} \quad (3)$$

$$D_{min}=D_{02}\times L_{total}=-532.035 \text{ ps/nm} \quad (4)$$

where $D_{min}$ and $D_{max}$ are the minimum and maximum dispersion values, respectively, that the AHOM illustrated in FIG. 4 can yield. Thus, the minimum step size for dispersion tuning, $D_{step}$ of this device is:

$$D_{step} = \frac{D_{max} - D_{min}}{2^6 - 1} = 9.518 \text{ ps/nm-km} \quad (5)$$

Figure 5:
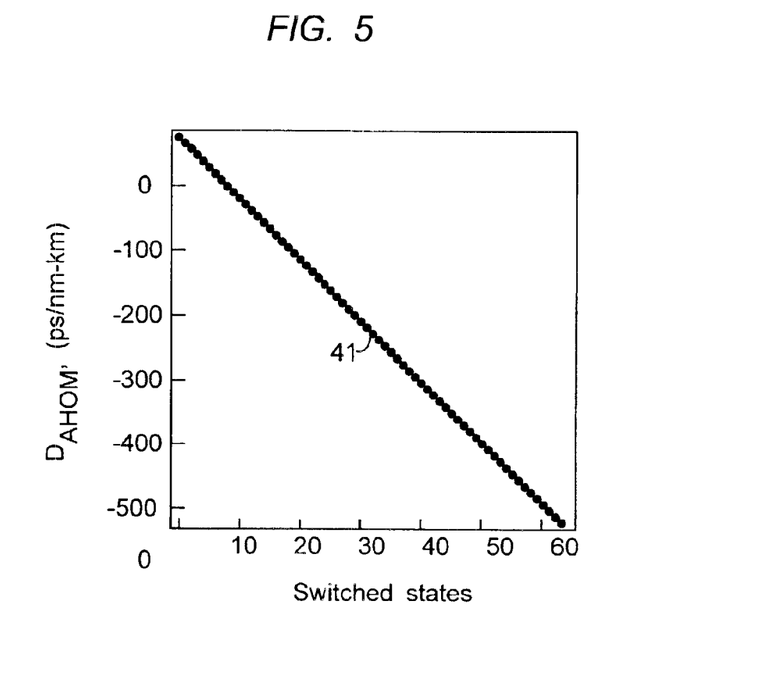
FIG. 5 is a plot showing the dispersion values for a series of 6 MCs switched into multiple configurations (represented by the circles in the figure)

FIG. 5 shows the dispersion values (at 1550 nm) that can be obtained by switching the series of 6 MCs into one of 64 allowable configurations (each represented by a circle, e.g. 41). As is evident, this shows that a tuning range as large as 600 ps/nm, in steps of less than 10 ps/nm can be realized by assembling 3.15 km of HOM fiber in six segments, joined with 7 MCs. The states 0 through 63 can easily be translated into specific configurations of "ON" and "OFF" states for the MCs in the following manner. Realizing that the set of concatenated fibers and MCs represents a monotonic series of increasing dispersion in powers of 2, each possible configuration for the AHOM can be represented by a binary number with 6 digits. Assigning the value "0" for a segment where light propagates in the $LP_{01}$ mode, and "1" for a segment where light propagates in the $LP_{02}$ mode, the dispersion of the AHOM can simply be deduced by converting the resulting binary number (from the sequence constructed above) into a decimal number (which would range from 0 through 63). For a decimal number d obtained thus, the dispersion of the device, $D_{AHOM}$ is given by:

$$D_{AHOM}=D_{max}-(d\times D_{step}) \quad (6)$$

Figure 6:
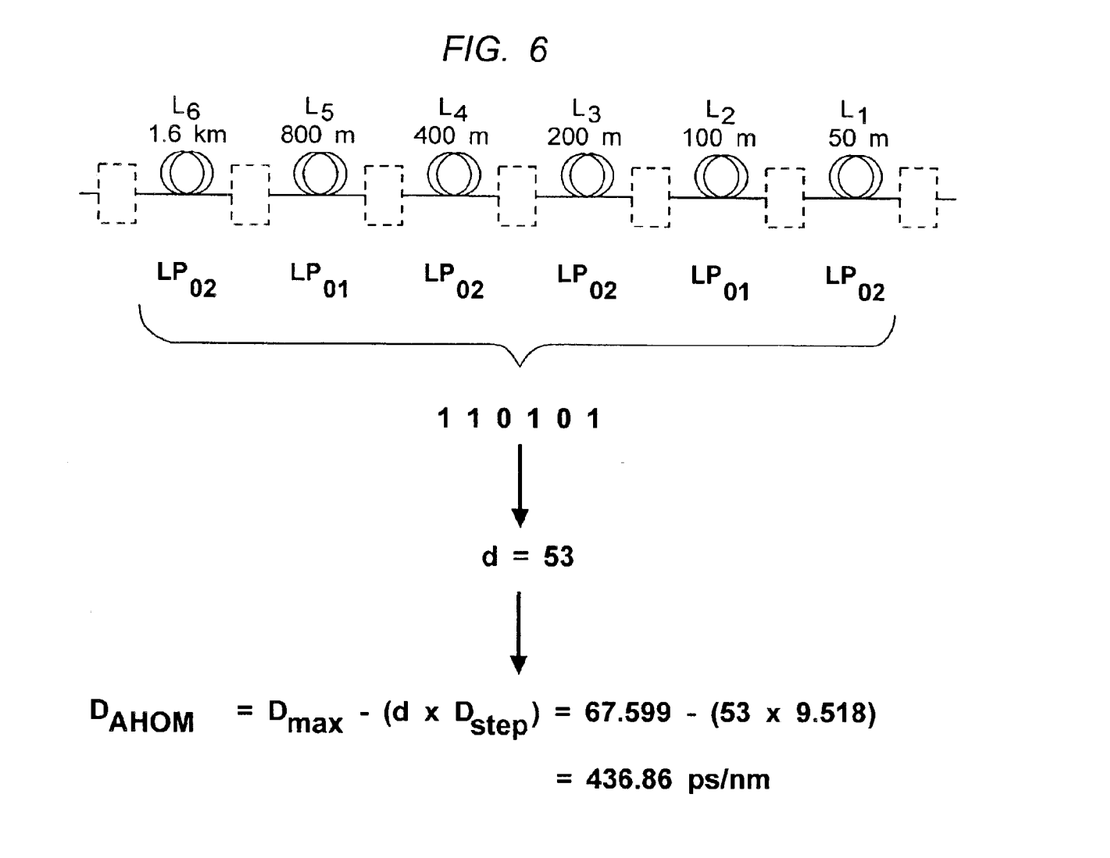
FIG. 6 is a chart illustrating a design approach for an adjustable dispersion compensator of the invention given a predetermined number of propagating modes.
Figure 7:
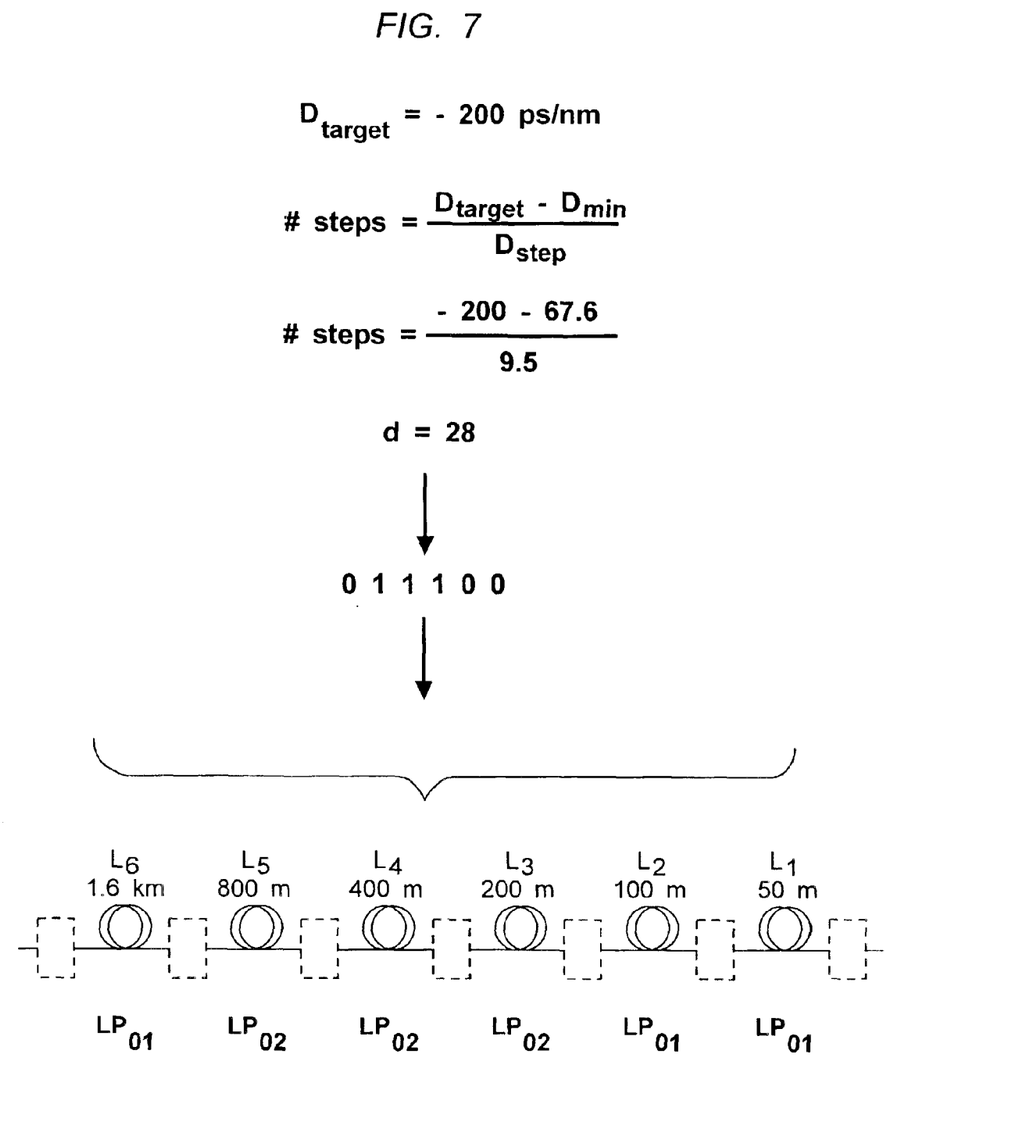
FIG. 7 is a chart similar to that of FIG. 6 illustrating the design approach for an adjustable dispersion compensator of the invention given a target dispersion value.

The flowchart showing these relationships for the switched state # 53 is shown in FIG. 6, which corresponds to a device dispersion value $D_{AHOM}=-436.855$ ps/nm. Conversely, given the desired dispersion, $D_{target}$, the reverse operation will yield a binary number, which uniquely defines the switched states for each MC. This flow chart is shown in FIG. 7 for a $D_{target}=-200$ ps/nm. The configuration obtained for this target yields $D_{AHOM}=-198.9$ ps/nm.

Figure 8:
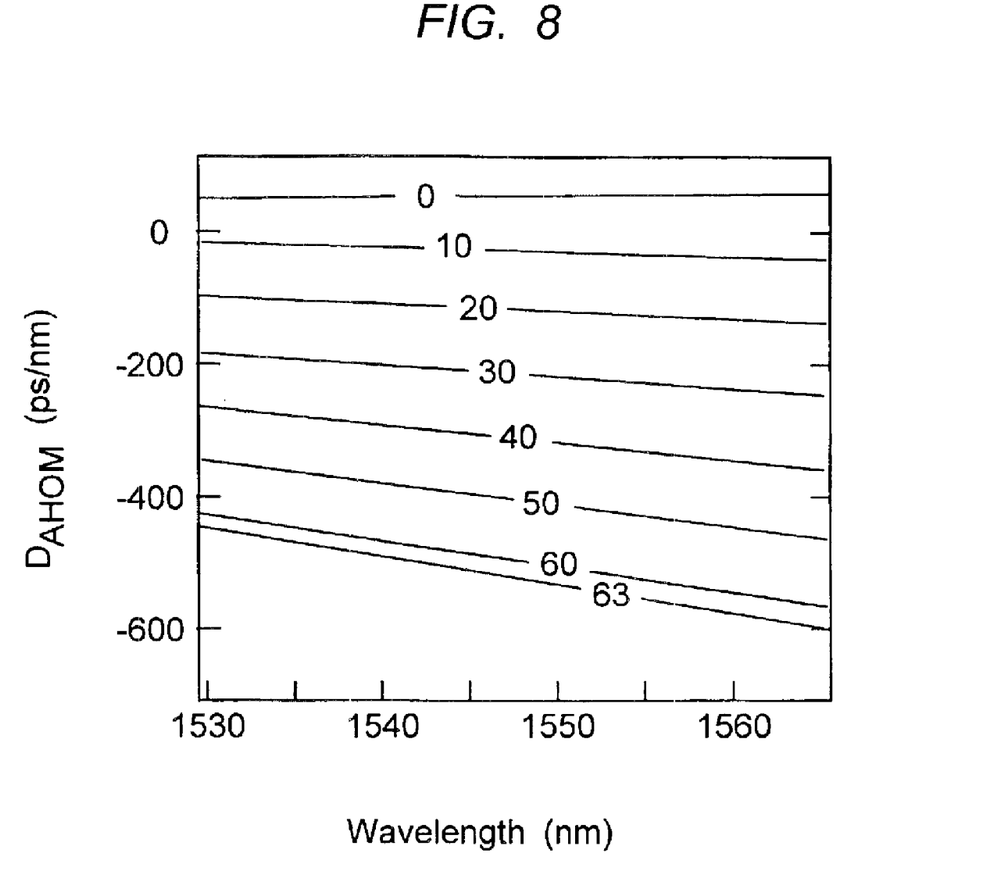
FIG. 8 shows the broadband dispersion tuning characteristics of the device of FIG. 4 for various switching states.

FIG. 8 shows the broadband dispersion tuning characteristics of this AHOM for various MC switching states: 0, 10, 20, 30, 40 50, 60 and 63, respectively. Note that, the bandwidth of this device is limited only by the bandwidth of the MCs. Since LPG MCs with more 60-nm bandwidth have been demonstrated, it is clear that such a device would cover the entire C or L band of an optical communications system without adding any additional impairments such as GD ripple. In addition, the dispersion tuning range of this device can be altered by changing the length of HOM fibers in the spools or by adding more segments.

The examples shown above use 6 segments of HOM fiber in a binary length progression (N=6 in Eq. 1) and 2 modes (M=2 in Eq. 1). A large number of alternative device configurations may be used. For example, the device may use more than two modes (M>2), different number of segments (N), and different HOM fiber length progression series, to achieve any desired dispersion tuning range, step size and dispersion value. Alternately, the different segments of HOM fibers may comprise HOM fibers with different dispersion, dispersion slope, and dispersion curvature properties, thus yielding additional degrees of freedom in assembling the device. All this can yield not only a broadband tunable dispersion compensator, but also a tunable dispersion slope and/or dispersion curvature compensator. In the most general configuration the AHOM can be tuned to yield any desired functional variation of dispersion with respect to wavelength.

As mentioned earlier, an important component for this device is the switchable MC. While the MC described and claimed in my co-pending application (referenced above) is especially suitable, alternative MC devices can be used. These may use, for example, coupled waveguides, phase-retardation plates, MEMs devices, among others. These MC devices should have the capability of switching action. The switch may be realized by including in the device structure, a layer of optical material whose refractive index can be changed by strain, temperature or an electro-optic or nonlinear-optic variation. Alternatively, the switching action may be achieved by straining, or otherwise changing the optical path length of the devices. If the LPGs are formed by acousto-optic excitation, the period of the grating may be changed by varying the frequency of the acousto-optic modulation impressed upon the fiber.

Figure 9:
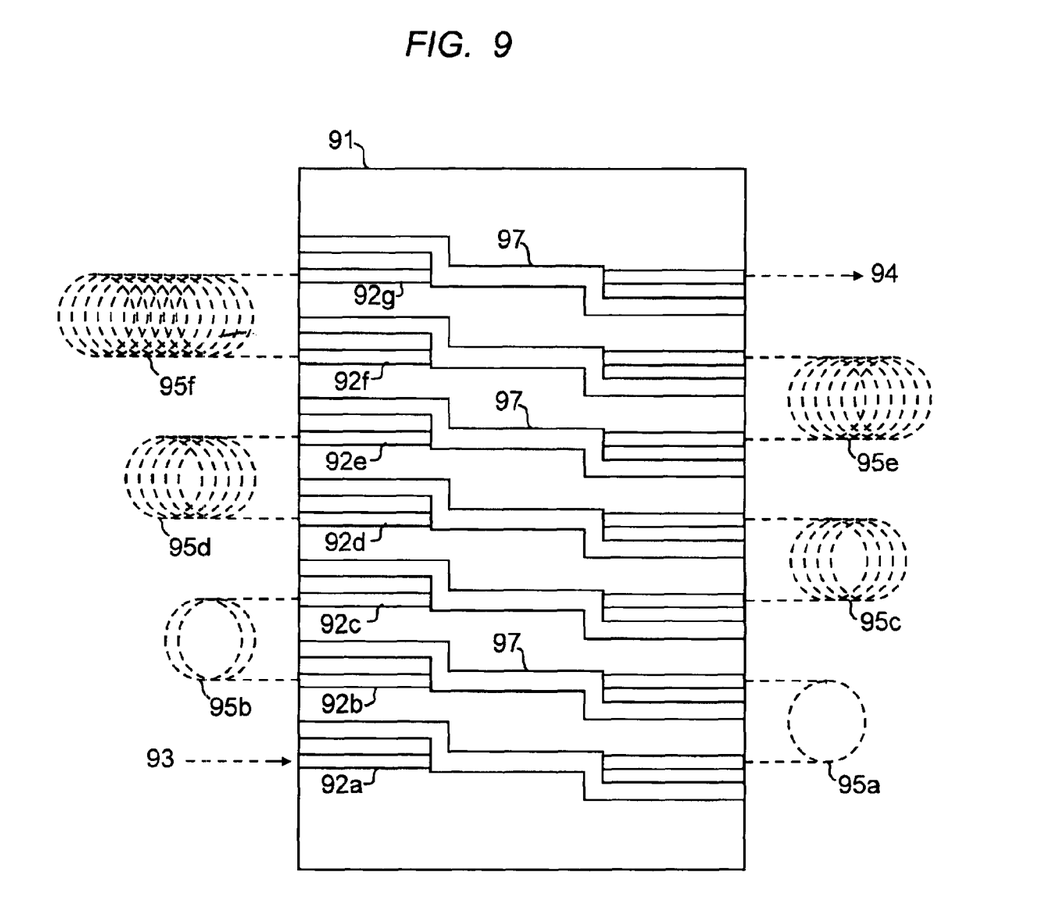
FIG. 9 is a schematic view showing an alternative form and arrangement of mode converters for the system of FIG. 4.

A suitable alternative is shown on a systems scale in FIG. 9. Here the object is to form the MC elements in an electro-optic material, e.g. lithium niobate, in which large arrays of lightguides, with convenient electrical switching means, can be integrated. FIG. 9 shows substrate 91, of electro-optic, non-linear optic, or acousto-optic material. Substrate 91 contains seven waveguides 92a–92g, one for each of the MC devices $MC_1$–$MC_7$ in the device shown in FIG. 4. The optical fiber path comprises input 93, output 94, and optical fiber spools 95a–95f. Spools 95a–95f correspond to spools $L_1$–$L_6$ in the device of FIG. 4. The switching elements are shown at 97. They comprise metal film electrodes overlying couplers or gratings (not shown) in the waveguides. The metal film electrodes are interconnected to appropriate voltage sources by the runners shown.

Long period gratings described in connection with the mode converters may be formed by various techniques. A common approach is to write the gratings into a doped fiber using UV light. Such gratings can also be realized by inducing periodic index changes due to heat, pressure, or light other than UV light. However, other methods may also be used. For example, microbend induced LPGs are suitable. These can be realized with acousto-optic gratings, arc-splicer induced periodic microbends, or by pressing the fiber between corrugated blocks that have the required grating periodicity.

The AHOM devices described above have many degrees of design freedom. Some of these are attributable to the use of optical fiber spools of different lengths. This allows the overall dispersion value to be varied depending on the relative path length chosen for the two (or more) propagating modes. The optical fiber lengths may be chosen, or designed, to have different dispersion values for a given mode even if they are the same length. Moreover, since two modes propagate with different dispersion values in the same fiber, devices like that of FIG. 4, where the lengths of fibers are equal, or nearly equal, may still provide the benefits of the invention.

It should be evident that the principles of the invention may be applied to systems using more than two core-guided modes. In the devices described above, the same two modes were assumed for each stage of the device, i.e. for each length $L_1$ to $L_6$ of FIG. 4, for instance. Alternatively, different fiber sections may be used wherein the two modes are different. For example, if the modes chosen for one stage of the device are $LP_{01}$ and $LP_{02}$, the modes chosen for another stage of the device might be $LP_{11}$ and $LP_{02}$.

Also within the scope of this invention, are AHOM devices with multiple HOM optical fiber segments wherein different segments have different fiber designs and properties. In this case, the dispersion due to a mode of the same order in the different HOM fibers, will be different. This yields a device that provides tunable dispersion, dispersion slope, dispersion curvature, or any optical property that is any arbitrary higher order derivative of dispersion as a function of wavelength.

Figure 10:
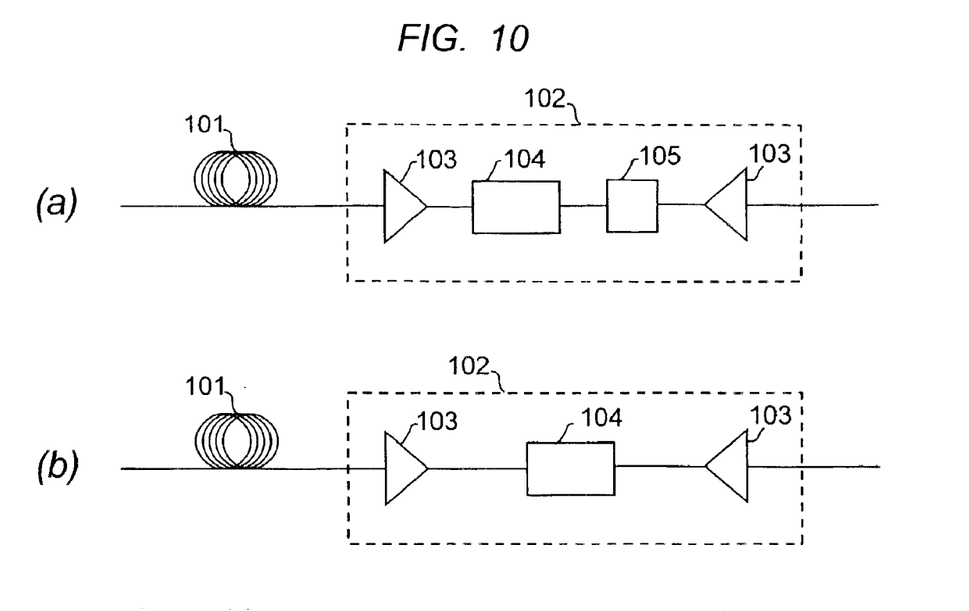

The AHOM device according to this invention has numerous applications in optical communication systems. FIG. 10 shows one preferred embodiment of an optical communication system enabled by the AHOM device. FIG. 10a shows the schematic of a fiber-optic transmission line in which an optical signal is transmitted through a predetermined length of transmission fiber, 101, followed by an optical amplifier module, 102. The optical amplifier module, 102, comprises gain blocks, 103, at its input and output, respectively. The gain blocks, 103, are connected to each other by means of an AHOM device according to this invention, 104, and a static dispersion compensation device (static DC), 105, which is commonly used in existing communication systems. FIG. 10b shows a similar optical communication system, where all the dispersion compensation is provided by the AHOM device alone, obviating the need for a static DC. The signal, after transmission through a predetermined length of transmission fiber, is attenuated. It also accumulates a significant amount of dispersion that may vary with time or the specific dispersion properties of the transmission fiber. The gain blocks provide the needed amplification to compensate for the loss of signal power. The AHOM device provides tunable dispersion for compensating the dispersion accumulated by the signal. The two schematics, FIGS. 10a and 10b, illustrate that the AHOM device may either provide tunable dispersion correction, with the majority of dispersion compensation being provided by the static DC, or may provide all the dispersion compensation required for the signal.

Figure 11:
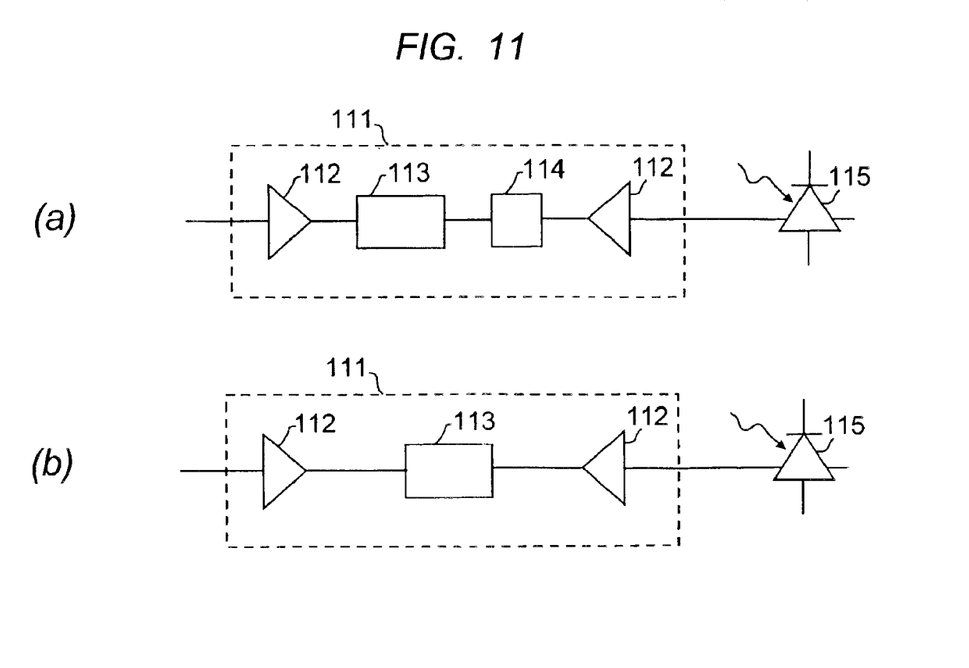

FIG. 11 shows another preferred embodiment of an optical communication system enabled by the AHOM device. FIG. 11a shows the schematic of a receiver comprising an optical amplifier module, 111, followed by an optical detection scheme, 115, which converts incoming optical signals into electrical signals. The optical amplifier module, 111, comprises gain blocks, 112, at its input and output, respectively. The gain blocks, 112, are connected to each other by means of an AHOM device according to this invention, 113, and a static DC, 114, which is commonly used in existing communication systems. FIG. 11b shows a similar optical communication system, where all the dispersion compensation is provided by the AHOM device alone, obviating the need for a static DC. The two schematics, FIGS. 11a and 11b, illustrate that the AHOM device may either provide tunable dispersion correction, with the majority of dispersion compensation being provided by the static DC, or may provide all the dispersion compensation required for the signal before it enters the optical detection device. The electronic portion of the optical detection scheme 115 may be connected to the electrical controls of the AHOM device 113 in the optical amplifier module 111 such that a feedback mechanism optimizes the performance of the receiver by changing the dispersion of the AHOM device.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical device comprising;
   a. a first length of optical fiber having length $L_1$, supporting at least a first core-guided mode and a second core-guided mode,
   b. a second length of optical fiber having length $L_2$, supporting at least a first core-guided mode and a second core-guided mode, wherein $L_1$ and $L_2$ are not equal.
   c. first mode converter (MC) means coupled to the input of $L_1$ for converting light between the first core-guided mode and light in the second core-guided mode,
   d. second MC means coupled between the output of $L_1$ and the input of $L_2$ for converting light between the first core-guided mode and light in the second core-guided mode,
   e. third MC means coupled to the output of $L_2$ for converting light between the first core-guided mode and light in the second core-guided mode, and
   f. means for independently switching each of the MC means from a state that passes the core-guided modes to a state that converts between the first core-guided mode and the second core-guided mode.

2. An optical device comprising:
   a. a first mode converter (MC) having a first switched state for converting an optical signal from a first mode to a second mode and a second switched state that does not for convert the optical signal light from the first mode to the second mode,
   b. a first length of optical fiber having length $L_1$, said first length of optical fiber supporting at least the first mode and the second mode, and having a first dispersion value for an optical signal in the first mode and a second dispersion value for an optical signal in the second mode,
   c. a second mode converter (MC) having a first switched state for converting the signal from the second mode to a third mode different from the second mode and a second switched state that does not convert the signal light from the second mode to third mode, thereby producing an optical signal output, d. a switching element for switching the first MC to the first switched state to produce an optical signal output with the first dispersion value, and for switching the first MC to the second switched state to produce an optical signal output with the second dispersion value.

3. The optical device of claim 2 wherein the first mode and the third mode are the same.

4. An optical device comprising;
   a. a series $L_1$ to $L_N$ of lengths of optical fiber, each length supporting at least two core-guided modes, wherein the series $L_1$ to $L_N$ of lengths of optical fiber have different lengths and the lengths are multiples of $L_1$.
   b. a series $MC_1$ to $MC_{N+1}$ of mode converters (MC) alternating between the series $L_1$ to $L_N$,
   c. means for independently switching each MC from a state that passes a core-guided mode to a state that converts a core-guided mode.

5. The optical device of claim 2 wherein the mode converters comprise:
   i. a length of optical fiber having a TAP, and having at least a first core-guided mode and a second core-guided mode,
   ii. means for converting light in the first core-guided mode to light in the second core-guided mode, said means comprising an LPG in the length of optical fiber, and
   iii. means for adjusting the refractive index of at least a portion of the length of optical fiber.

6. The optical device of claim 5 wherein the LPG has a grating period Λ, and Λ corresponds to the TAP to within 5%.

7. The optical device of claim 2 wherein the means for switching the MCs is a temperature control means.

8. The optical device of claim 2 wherein the means for switching the MCs is strain.

9. The optical device of claim 2 wherein the means for switching the MCs is a nonlinear-optic means.

10. The optical device of claim 2 wherein the means for switching the MCs is an acousto-optic means.

11. The optical device of claim 2 wherein the means for switching the MCs is a stress-optic means.

12. The optical device of claim 2 wherein the means for switching the MCs is an electro-optic means.

13. An optical communication system comprising a transmission fiber in combination with the optical device of claim 2.

14. An optical communication system comprising a transmission fiber in combination with
   a. a series $L_1$ to $L_N$ of lengths of optical fiber, each length supporting at least two core-guided modes,
   b. a series $MC_1$ to $MC_{N+1}$ mode converters (MC) alternating between the series $L_1$ to $L_N$.
   c. means for independently switching each MC from a state that passes a core-guided mode to a state that converts a core-guided mode further comprising a static dispersion compensating device.

15. In an optical communication system, an optical receiver comprising
   a. a series $L_1$ to $L_N$ of lengths of optical fiber, each length supporting at least two core-guided modes,
   b. a series $MC_1$ to $MC_{N+1}$ of mode converters (MC) alternating between the series $L_1$ to $L_N$.

c. means for independently switching each MC from a state that passes a core-guided mode to a state that converts a core-guided mode in combination with a static dispersion compensator followed by a photodetector.

16. The optical device of claim 2 wherein the third mode and the first mode are the same.

17. The optical device of claim 2 further comprising:
   e. a second length of optical fiber having length $L_2$, said second length of optical fiber supporting at least a third mode and a mode different from the third mode, and having a first dispersion value for an optical signal in the third mode and a second dispersion value for an optical signal in the mode different from the third mode,
   f. a third mode converter (MC) having a first switched state for converting the signal from the third mode different mode and a second switched state that does not convert the signal light from the third mode to a different mode, thereby producing an optical signal output,
   d. a switching element for switching the second MC to the first switched state to produce an optical signal output with the first dispersion value of the second length of optical fiber, and for switching the second MC to the second switched state to produce an optical signal output with the second dispersion value of the second length of optical fiber.

18. The optical device claim 17 wherein length $L_1$ and $L_2$ are the same.

19. The optical device of claim 17 wherein length $L_1$ and $L_2$ are different.

20. Method comprising:
   a. transmitting an optical signal through a first mode converter (MC) having a first switched state for converting the optical signal from a first mode to a second mode and a second switched state that does not for convert the optical signal light from the first mode to the second mode
   b. transmitting the optical signal through a first length of optical fiber having length $L_1$, said first length of optical fiber supporting at least the first mode and the second mode, and having a first dispersion value when the optical signal is in the first mode and a second dispersion value when the optical signal is in the second more,
   c. transmitting the optical signal through a second mode converter (MC) having a first switched state for converting the signal from the second mode to a mode different from the second mode and a second switched state that does not convert the signal light from the second mode to a different mode, and wherein the second MC may be switched with the first MC in the first switched state and may be switched with the first MC in the second switched state, thereby producing an optical signal output,
   d. switching the first MC to the first switched state to produce an optical signal output with the first dispersion value, and
   e. switching the first MC to the second switched state to produce an optical signal output with the second dispersion value.

* * * * *